United States Patent
Zhang et al.

(10) Patent No.: US 10,499,009 B1
(45) Date of Patent: Dec. 3, 2019

(54) REALISTIC 24 FRAMES PER SECOND OUTPUT FROM HIGH FRAME RATE CONTENT

(71) Applicant: PIXELWORKS, INC., Portland, OR (US)

(72) Inventors: Bob Zhang, Santa Clara, CA (US); Xuan Wu, Dublin, CA (US); Minghui Yang, Shanghai (CN)

(73) Assignee: PIXELWORKS, INC., Portland, OR (US)

( * ) Notice: Subject to any disclaimer, the term of this patent is extended or adjusted under 35 U.S.C. 154(b) by 0 days.

(21) Appl. No.: 16/141,455

(22) Filed: Sep. 25, 2018

(51) Int. Cl.
H04N 7/01 (2006.01)

(52) U.S. Cl.
CPC ......... *H04N 7/0127* (2013.01); *H04N 7/0102* (2013.01); *H04N 7/014* (2013.01)

(58) Field of Classification Search
CPC .... H04N 7/0127; H04N 7/0102; H04N 7/014; H04N 7/015; H04N 7/50; H04N 7/26244; H04N 7/145
USPC ......... 348/441, 451, 452, 469, 430.1, 439.1, 348/490, 575, 663, 667, 208.13, 208.4, 348/208.1, 180, 155, 154; 375/240.16, 375/240.1
See application file for complete search history.

(56) References Cited

U.S. PATENT DOCUMENTS

| | | | | |
|---|---|---|---|---|
| 5,343,241 A * | 8/1994 | Richards | ................ | H04N 5/14 348/911 |
| 7,143,432 B1 * | 11/2006 | Brooks | ............ | H04N 21/23436 725/105 |
| 9,307,148 B1 * | 4/2016 | Baldwin | ............ | H04N 5/23267 |
| 10,284,810 B1 * | 5/2019 | Shoa Hassani Lashdan | ............... | H04N 7/014 |
| 2005/0168646 A1 * | 8/2005 | Johnson | .................... | H04N 9/78 348/663 |
| 2008/0055481 A1 * | 3/2008 | Delanghe | ................. | H04N 9/78 348/667 |
| 2010/0259627 A1 * | 10/2010 | Trumbull | ............... | G03B 15/00 348/208.4 |
| 2010/0328468 A1 * | 12/2010 | Chang | .................. | G06T 3/4007 348/180 |
| 2011/0141348 A1 * | 6/2011 | Jia | .......................... | G06T 3/4053 348/441 |
| 2011/0149150 A1 * | 6/2011 | Jia | ............................. | G06T 1/00 348/452 |
| 2012/0314975 A1 * | 12/2012 | Shin | ..................... | H04N 7/0117 382/299 |

(Continued)

*Primary Examiner* — Jefferey F Harold
*Assistant Examiner* — Mustafizur Rahman
(74) *Attorney, Agent, or Firm* — Miller Nash Graham and Dunn

(57) ABSTRACT

A method of converting an input frame rate of input video frames includes upsampling at least some of the input video frames to produce upsampled frames at a higher frame rate than the input frame rate, applying a filter to combine together multiple frames at a single pixel location, downsampling the upsampled frames to an output frame rate. A method of converting an input frame rate of input video frames includes grouping input video frames together, wherein a number of groups per second is less than a capture frame rate, and interpolating the frames within a group to obtain a desired shutter angle, wherein an average time between frames within a group is less than a time between groups.

16 Claims, 10 Drawing Sheets

(56) References Cited

U.S. PATENT DOCUMENTS

| | | | |
|---|---|---|---|
| 2014/0098886 A1* | 4/2014 | Crenshaw | H04N 19/176 375/240.16 |
| 2015/0078449 A1* | 3/2015 | Diggins | H04N 7/0127 375/240.16 |
| 2015/0093015 A1* | 4/2015 | Liang | G06T 3/4076 382/154 |
| 2015/0104116 A1* | 4/2015 | Salvador | G06T 3/4053 382/300 |
| 2015/0379689 A1* | 12/2015 | Andreopoulos | G06T 3/4046 382/158 |
| 2016/0301871 A1* | 10/2016 | Kuchiki | H04N 5/23261 |
| 2017/0054938 A1 | 2/2017 | Xu et al. | |
| 2017/0264861 A1* | 9/2017 | Xu | H04N 5/145 |
| 2018/0020229 A1* | 1/2018 | Chen | H04N 19/51 |
| 2018/0025686 A1* | 1/2018 | Templin | H04N 21/44024 348/367 |

* cited by examiner

REALISTIC 24 FRAMES PER SECOND OUTPUT FROM HIGH FRAME RATE CONTENT

BACKGROUND

In the history of film production, the cost of the film and its development determined the frame rate. In the beginning, a variety of different frame rates were used. Eventually, 24 frames per second (fps) became the standard film frame rate. Today, even though digital cameras can shoot at a variety of frames per second, 24 fps is usually chosen. This results in audiences being comfortable with the feel of most moving images at this frame rate. Viewers see higher frame rates as having a cheaper video, or less cinematic feel to them.

In the dark cinema environment, the projector projects the films to the screen by using a double (48 fps) or in most cases triple (72 fps) flashing of the content. It takes a finite amount of time to move the film from one frame to the next and during that time the shutter needs to close so that the movement is blocked from being projected. The eye can notice the flicker at frame rates below this. While this works for still images, the overall frame rate is still 24 fps. Therefore high contrast or high luminance edges will have a strobing artifact. Because people are accustomed to the 24 fps film performance, small amounts of strobing are usually not noticed and found acceptable. Directors and cinematographers try to minimize objectionable strobing by controlling lighting, movement and the shutter angle of the camera.

High dynamic range technology, as used here, means technology that have a difference between the blacks and whites of 5 orders of magnitude. HDR has existed for several years, but only recently have displays been able to display HDR. HDR may result in more and more content that contains objectionable amounts of judder because the peak luminance and contrast of the content has been increased. So while the HDR film will bring more video fidelity, color and details; it also makes the 24 Hz strobing worse.

To reduce the 24 Hz strobing effect, some approaches use frame rate conversion methods to generate high frame rate content for HDR display. In addition, some directors have shot and released films shot at higher frame rate such as 48 and 120 fps. Audiences have not universally accepted these as an improvement. What is needed is a method to maintain the look and feel of 24 fps content while reducing the strobing to an acceptable level.

When films are shoot at 120 fps and then played in a traditional 24 Hz cinema, typically the playback drops most of the original frames causing a too-small shutter angle that results in an unnatural feel to because of more noticeable strobing artifacts and a more noticeable stutter to the motion. While combining original frames together can increase the shutter angle, the adjustment is coarse and limits the original content to being shot at a 360 degree shutter angle. For example, if the original was shot at 120 fps and a 360 shutter angle, the choices for the shutter angle at 24 fps are 72, 144, 216, 288 or 360. This may not provide the flexibility required to trade-off blur versus strobing artifacts.

The traditional way of reducing the strobing artifact increases the exposure time during filming causing any moving object to blur. In cinema, the exposure time is referred to the shutter angle. A 360 shutter angle results in an exposure equal to inverse of the frame rate. A 180 shutter angle has ½ that exposure. The longer the exposure time, the more the moving edge blurs and a lower amount of the edge flicker or strobing produced. The downside of long exposures results in portions of the scene without objectionable strobing to also blur.

Traditionally, the shutter angle or exposure time of the 24 fps video camera is set to ½ of the frame rate, equaling a shutter angle of 180 degrees, which can get a natural looking image with motion blur. With the shutter angle at 180 degrees, the exposure time of each frame in the 24 fps film equals $\frac{1}{48}$ second, and the exposure time of each frame in the 120 fps film equals $\frac{1}{240}$ second. The film director can change the shutter angle for different use cases and different scenes. Larger shutter angles will create a blurrier image, and a smaller shutter angle will produce a sharper image but with more stutter.

Existing methods of converting high frame rate content to lower frame rates have been constrained to dropping or creating a weighted average of a couple of input or output frames together and/or inserting new interpolated frames at new output time intervals, or replacing existing frames with interpolated frames. US Patent Publication US2017/0054938 to Xu discloses several such methods. These existing methods do not provide the same quality or flexibility that a cinematographer has in the field with respect to both selecting the frame rate and controlling the amount of blur in the shot.

DETAILED DESCRIPTION OF THE EMBODIMENTS

Figure 1:
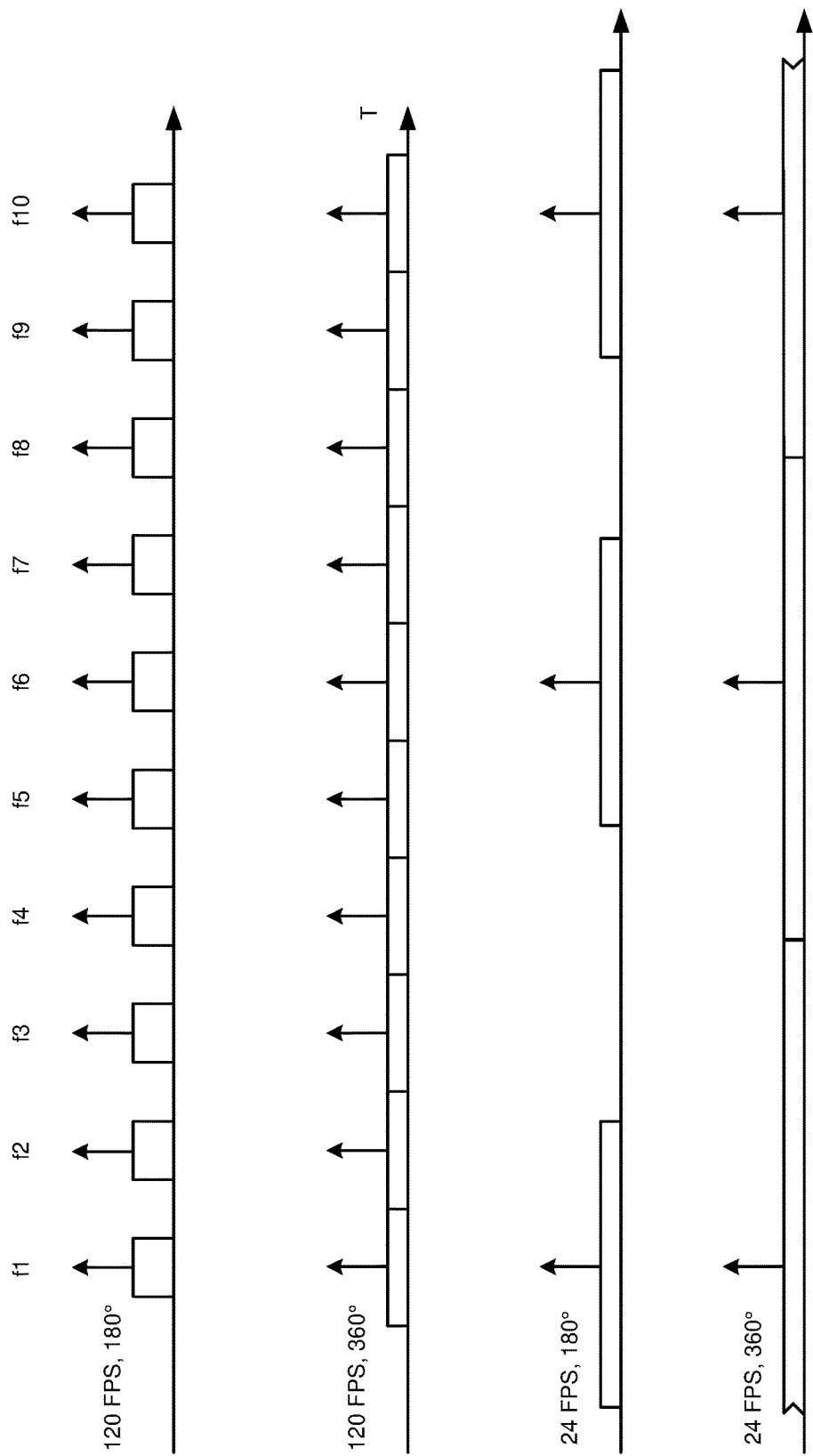
FIG. 1 shows a graphical representation of exposure times for 24 fps and 120 fps with different shutter angles.

In the following discussion, several terms have particular meanings. The strobing effect caused by high contrast edges moving fast in a movie theater may go by a variety of names in the literature, including judder, edge flicker, and strobing. Typically, the only term applied only to this motion artifact, rather than having more than one meaning, is strobing. Edge flicker may be used to describe something that has low motion, but the edge is very sharp, sharp enough to causes aliasing. Judder is the most common term, as is used in US Patent Publication 2017/0054938 to Xu. However, this term is sometimes used to describe the uneven strobing effect caused by transferring 24 fps material to 60 fps. This typically follows a repeat pattern of 2:3:2:3, which may cause a low amplitude 12 Hz start-stop on top of the 24 Hz start-stop of the original film. The following discussion will therefore use "strobing" to describe the artifact caused by fast moving, high contrast edges.

The term "jank" as used here means random or sudden changes in the motion during a pan or scroll movement caused by dropping or repeating a frame. The mobile/laptop technology areas use jank to describe an asynchronous update of the screen that creates an unsmooth motion artifact. For example, the entering and exiting of frame rate conversion may cause jank to appear.

Another term used here, "soap opera effect" means the reduction or elimination of the cinematic feel of the picture. It creates an overly smooth motion and too clear of a picture that distracts from the story telling.

The term "cinematic feel" means an overall look and feel of the film that matches the look and feel of a movie played in a cinema. Several things may contribute to cinematic feel, including depth of field, shutter angle, frame rate, dynamic range, etc. As used here, cinematic feel will relate to depth of field, shutter angle and frame rate. Changing these parameters changes how much of the scene details one can easily see. Video cameras in the past have had smaller sensors and therefore a larger depth of field and the ability to see more details. To the extent that one changes the scene to display so that the view can see more details than in a normal picture, one loses the cinematic feel that people expect. Therefore, increasing the frame rate or increasing the depth of field both result in a more video like appearance. Shutter angle has more complexity. Shutter angle makes the content look closer to the 360-degree shutter angle of video. It also impacts the content because it makes it easier to focus on the slow moving parts, typically what the director wants the audience to pay attention to, by blurring out the strobing artifacts of high motion background, however it can also result in seeing less detail in the slower moving areas resulting in a lower quality image.

The term "non-constant time interval" means capturing or interpolating frames such that the time between them is not constant. This may preserve some of the cinematic fee when going to higher frame rates.

FIG. 1 shows the exposure time of 120 fps and 24 fps film with different shutter angles. While a variety of fps can be used for capture, most content is captured at 24, 48 or 120 fps. For the purposes of this discussion, the high frame rate material will be assumed to be 120 fps. Generating 24 Hz film from 120 Hz film, only using 1 out of 5 frames of the 120 fps material is usually not an appropriate choice. The shutter angle at 24 fps will be decreased by 80% compared to the shutter angle at 120 fps, while the exposure time remains unchanged. A shutter angle of 36 or 72 degrees is much shorter than the traditional 24 fps film, with a 180 degree shutter angle, and an exposure time of ¼s second. This will make the image too sharp compared with traditional 24 fps film and make the judder worse than if captured directly at 24 fps.

From the exposure time, each frame of the 24 fps film will take 2.5 times compared with 120 fps film. To get a similar blurry image as normal 24 fps film, the process needs to blend several frames of 120 fps film to get a similar exposure time as 24 fps film.

Figure 2:
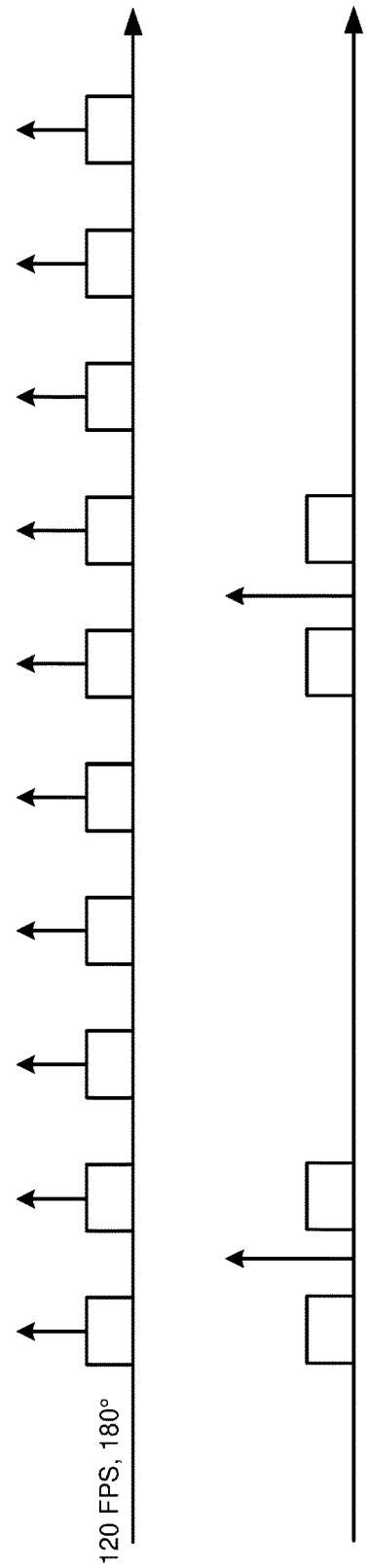
FIG. 2 shows an example of a double image.

For 120 fps film, the most common shutter angle is 360 degrees. However, this is because the existing methods of converting to lower frame rates simply average the input frames together. Other frame rates and shutter angles are possible, but require more sophisticated processing when converting to a lower frame rate as will be disclosed below. For example, if the content was captured at 120 fps with a 180 degree shutter angle and the conversion to 24 fps averaged 2 frames together and dropped 3, the image would not be a simple blur but would appear as a double image as shown in FIG. 2. It is anticipated that anything less than 270 degree shutter angle will result in a visible double image. The handling of this case will be described later.

The first method of achieving a film like look without changing the frame rate would be to resample the video to generate video that looks as if it was sampled in a non-constant time period. This method relies on the eye blurring the image. This works as long as the equivalent shutter angle is relatively small. To make the video look like it was captured at a lower frame rate, the process assigns the frames into groups and the number of groups per second is set equal to the desired frame rate that provides the cinematic feel the director wants. For example, if one wants the 120 fps video to look like 24 fps film one can create groups of 5 frames: 5=120/24. Each group may also have a different number of frames. For example, if you have 60 fps video and want it to look like 24 fps film, the ratio is 2.5 then one group would have 3 frames and the other would have 2 frames. Then the process interpolates the input frames using motion estimation and motion compensation (MEMC) interpolation, a process that generates frames of image data between two original frames of image data, using motion between the two frames to ensure that the motion is consistent across the new frames. The MEMC process is adjusted such that the new frame has a distance between the first and last frame of the group that is equivalent to the shutter angle desired. If the shutter angle is less than 360 degrees, then the average time between frames in a group is less than the time between groups. When the group sizes are unequal, the distance can either between the first and last frame of each group or the average number of frames of all the groups.

OSA=Output Shutter Angle
ISA=Input Shutter Angle
IFR=Input Frame Rate
OFR=Output Frame Rate
IntP=Interpolation Phase $$IntP=[(IFR/OFR)\times OSA-ISA]/[360\times(IFR/OFR-1)]$$

If one starts with the interpolation phase for the MEMC interpolation one can calculate the equivalent output shutter angle using the following:

$$OSA=(IntP*((IFR/OFR)-1)*360*OFR/IFR)+ISA*OFR/IFR$$

If one wants to have an output shutter angle of 180 degrees and a look close to the original 24 fps starting with a 360 degree shutter angle at 120 fps, then one ends up with an interpolation phase of 0.375 between frames (or 135 degrees in the input frame rate).

Figure 3:
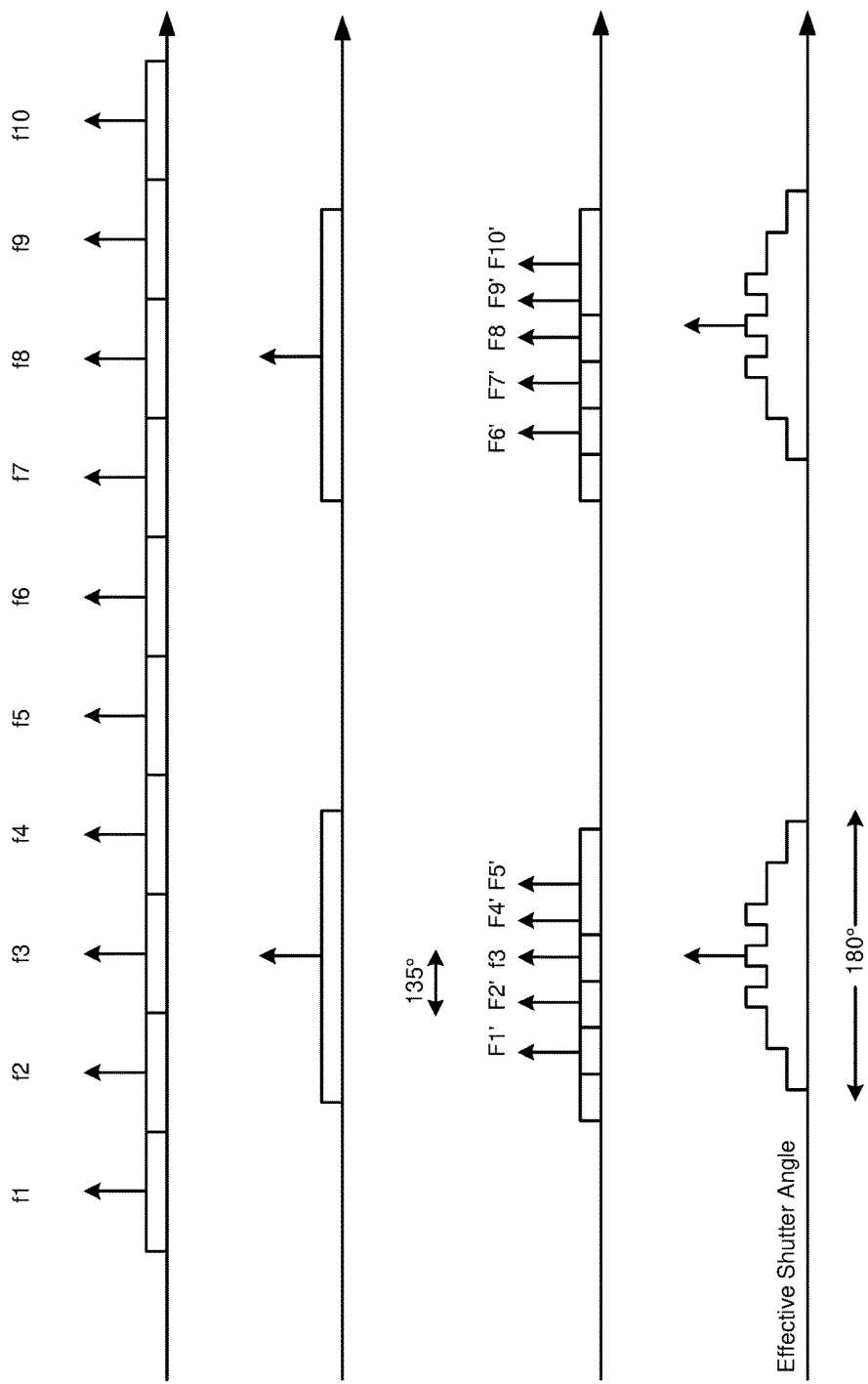
FIG. 3 shows a graphical representation of input frames and interpolated frames being displayed at a same rate.

In FIG. 3, the input frames are f1-f10 on the top row and the interpolated frames are shown on the bottom row. The bottom row frames would be displayed at the same rate as the input frame rate, but because F1' to F5' are now interpolated, what is being seen is similar to a 24 fps capture rate with 180 degree shutter angle, represented by the rectangle on the bottom.

If the desire is to generate an output frame rate by converting the input frame rate to a lower frame rate, then one would average the groups of frames together into a single output frame. The generated frames can also be weighted to provide a different looking shutter angle and the phases do not have to be equal. In the above example, the 0.375 phase increment is applied twice before and after the f3 and f8. That is, the first phase is −0.75 and the last phase is +0.75. The intermediate phase can be anything between 0 and those two phases as long as the input shutter angle is large enough.

The drawback of this method is that the output shutter angle is related to the unequal sampling periods for the frame. For example, to get a 360 degree shutter angle, the input and output frames are the same, that is the interpolation phase found above=1 instead of 0.375. If the result is not down-sampled to the desired output frame rate, the content will lose the cinematic feel and does not mimic the actual look of 24 fps shot with a 360 degree shutter angle. That is, the strobing artifacts might be gone, but the result will look like a cheap video. To make the shutter angle and the cinematic feel more independent, additional processing is required so that the unequal sampling periods are made independent of the shutter angle.

Figure 4:
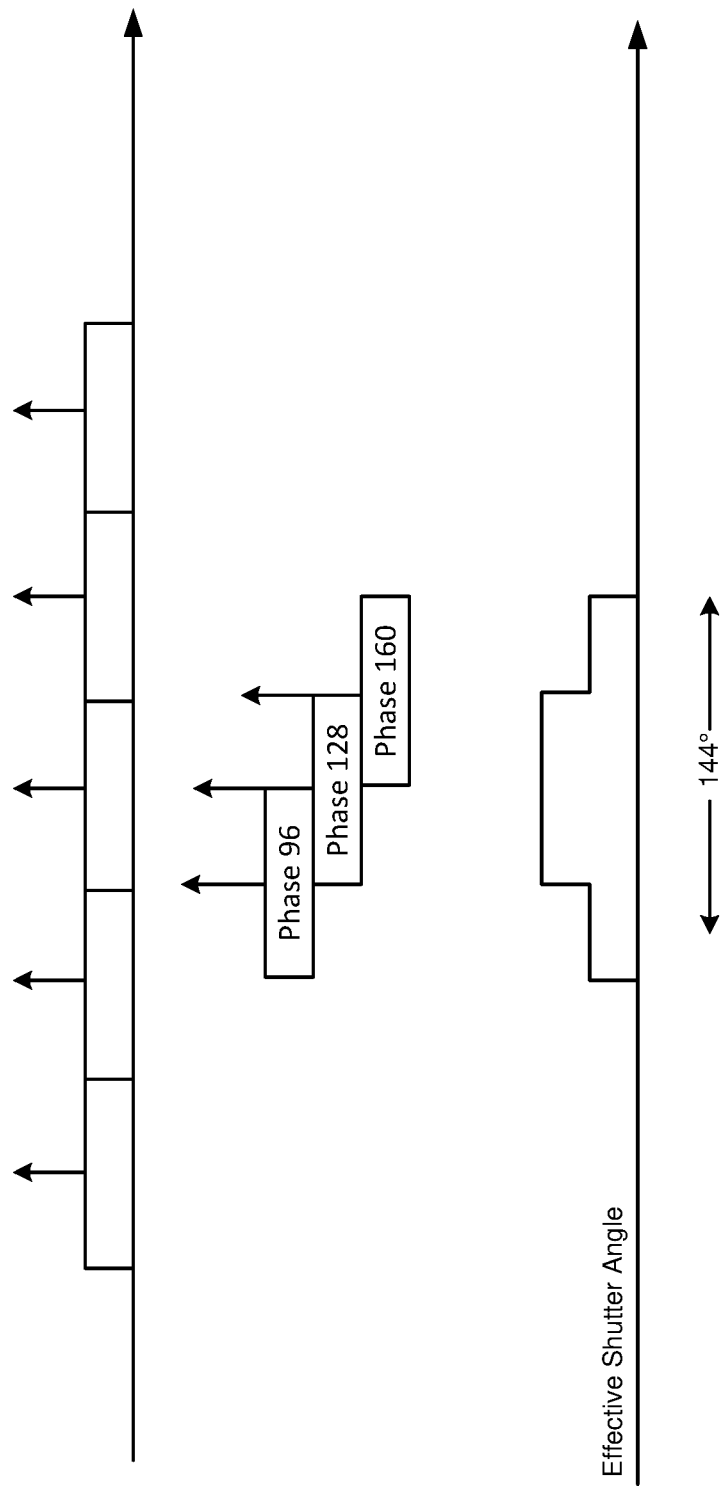
FIGS. 4-6 shows graphical representations of exposure times of blending phases of 120 fps film with a 360 degree shutter angle.
Figure 5:
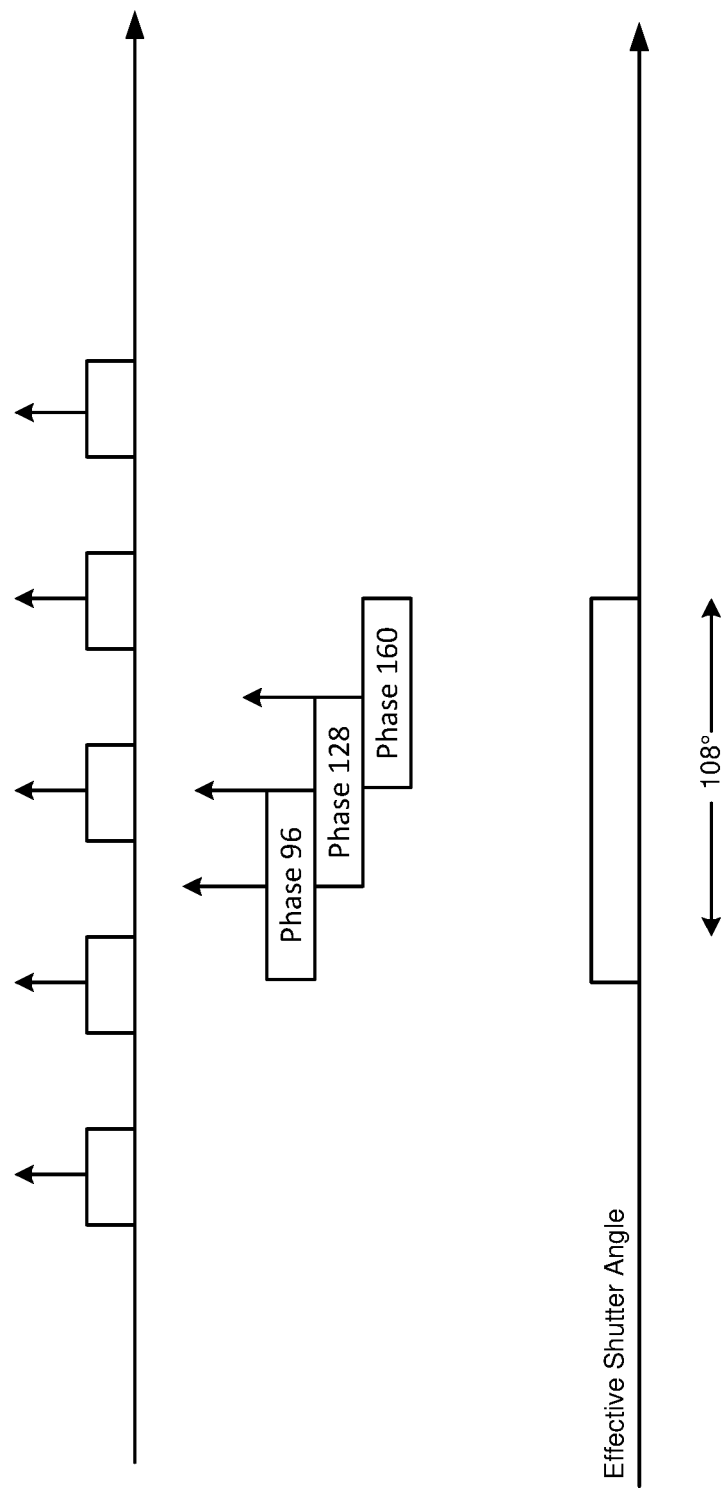
Figure 6:
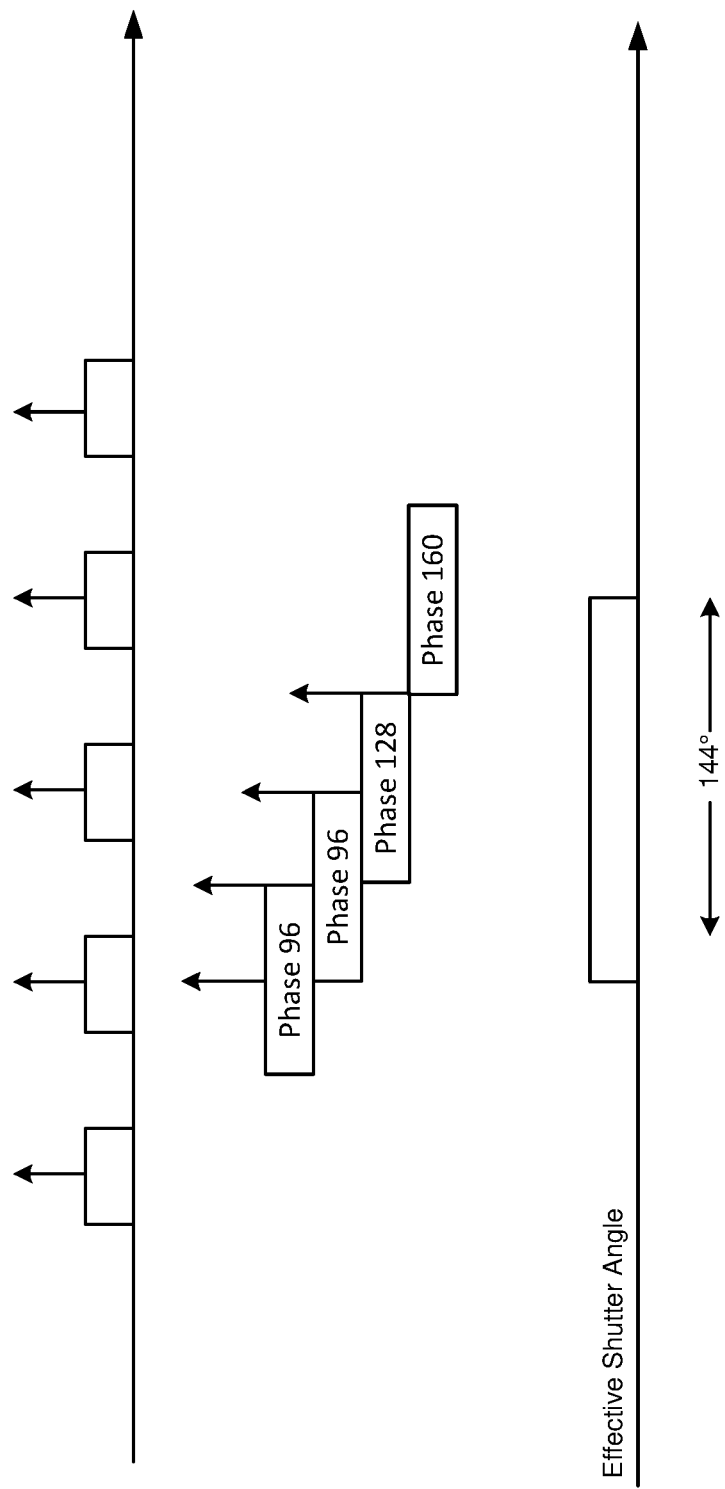

FIGS. 4-6 shows the exposure time of blending phase of 120 fps film with 360 degree shutter angle. Here, the process splits the time between two 120 fps frames into 64 interpolation phases thereby raising the effective frame rate to 7,680 fps. Phases greater than 64 or less than 0 imply interpolating between different frames. For example, phase 96 means the center position of frame 1 and frame 2, phase 128 means frame 2 and phase 160 means the center position of frame 2 and frame 3 as shown in FIG. 4. If the initial 120 fps shutter angle is 360 degrees, the minimum shutter angle at 24 fps is 72 degrees and a change in phase between the first and last frame being blending of 64 phases also represents one output frame or 72 degrees. Therefore the shutter angle has the following relationship:

Shutter angle=72+delta_phase*(72/64).

In FIG. 4 the blending results from phase 96 to 160 will occupy (½+1+½)*1/120=1/60 s from end to end, which is close to 144 degrees shutter angle of 24 fps film. By selecting different phases for the interpolated end and start frames we can adjust the shutter angle continuously from 72 to 360 degrees or even higher of 24 fps film. FIG. 5 shows a 108 degree shutter angle using 120 fps input at 180 degrees, and FIG. 6 shows a 144 shutter angle using 120 fps input at 180 degrees by repeating phase 96. This provides a natural looking shutter exposure with the ability to adjust the shutter angle in just over 1 degree increments.

However, as shown in FIG. 4, if the process blends only 3 frames together then edge blurring, where one sees the background through the foreground object, will have a noticeable change in visibility. This is especially true if the motion is larger than the object itself, for example a fence or pole. To get a more natural look the output should be the integral of all the phases between the start and end phase where the start and end position define the shutter angle.

The start position, end position and input frame rate shutter angle determine the output shutter angle. The images taken by the camera using the similar exposure time can be thought of as integrating of all the phases of a very small shutter angle inside the exposure time. That is, one can use the phase blending result between the start position and end position to simulate the similar result of the camera using similar exposure time.

Figure 7:
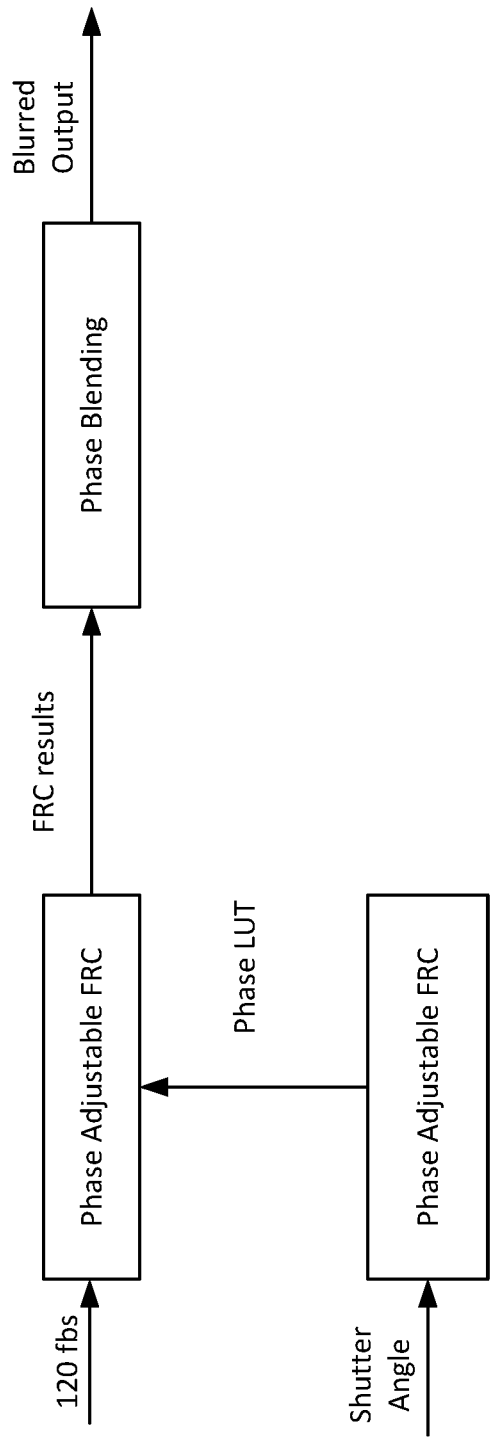
FIG. 7 shows a graphical representation of an embodiment to create a blurred output based upon a high frame rate input.

FIG. 7 shows a diagram of an embodiment to create the blurred output based on the high frame rate input. A high quality motion compensated frame rate conversion algorithm is used to reconstruct the exact inter-phase 120 fps frames for the phase blending. The advantage of this method is that the blurring is confined to the object at that pixel. Using a directional FIR (finite impulse response) filter can result in the combination of foreground and background objects when they have different motion vectors.

To mimic the gentle blending between foreground and background, the ideal is to do the integral of all of the phases between the start and end phases. However, this is not practical. Therefore a compromise is used in which 17 phases are selected between the start and end positions.

Considering the implementation speed, the process selects 17 phases between start position and end position as following:

Shutter angle 108:

| 112 | 114 | 116 | 118 | 120 | 122 | 124 | 126 | 128 | 130 | 132 | 134 | 136 |
| 138 | 140 | 142 | 144 | | | | | | | | | |

Shutter angle 144:

| 96 | 100 | 104 | 108 | 112 | 116 | 120 | 124 | 128 | 132 | 136 | 140 | 144 |
| 148 | 152 | 156 | 160 | | | | | | | | | |

Shutter angle 180:

| 80 | 86 | 92 | 98 | 104 | 110 | 116 | 122 | 128 | 134 | 140 | 146 | 152 |
| 158 | 164 | 170 | 176 | | | | | | | | | |

Shutter angle 216:

| 64 | 72 | 80 | 88 | 96 | 104 | 112 | 120 | 128 | 136 | 144 | 152 | 160 |
| 168 | 176 | 184 | 192 | | | | | | | | | |

Shutter angle 252:

| 48 | 58 | 68 | 78 | 88 | 98 | 108 | 118 | 128 | 138 | 148 | 158 | 168 |
| 178 | 188 | 198 | 208 | | | | | | | | | |

Shutter angle 288:

| 32 | 44 | 56 | 68 | 80 | 92 | 104 | 116 | 128 | 140 | 152 | 164 | 176 |
| 188 | 200 | 212 | 224 | | | | | | | | | |

Shutter angle 324:

| 16 | 30 | 44 | 58 | 72 | 86 | 100 | 114 | 128 | 142 | 156 | 170 | 184 |
| 198 | 212 | 226 | 240 | | | | | | | | | |

Shutter angle 360:

| 0 | 16 | 32 | 48 | 64 | 80 | 96 | 112 | 128 | 144 | 160 | 176 | 192 |
| 208 | 224 | 240 | 256 | | | | | | | | | |

While the above shows even spacing of the phases, it is possible to use uneven spacing and compute the phases that have a fractional component and then round to the 64 phases shown above. The 64 phases only represent the final phase used in the motion compensated frame rate conversion process, not the accuracy of the calculations used to determine the phases.

Figure 8:
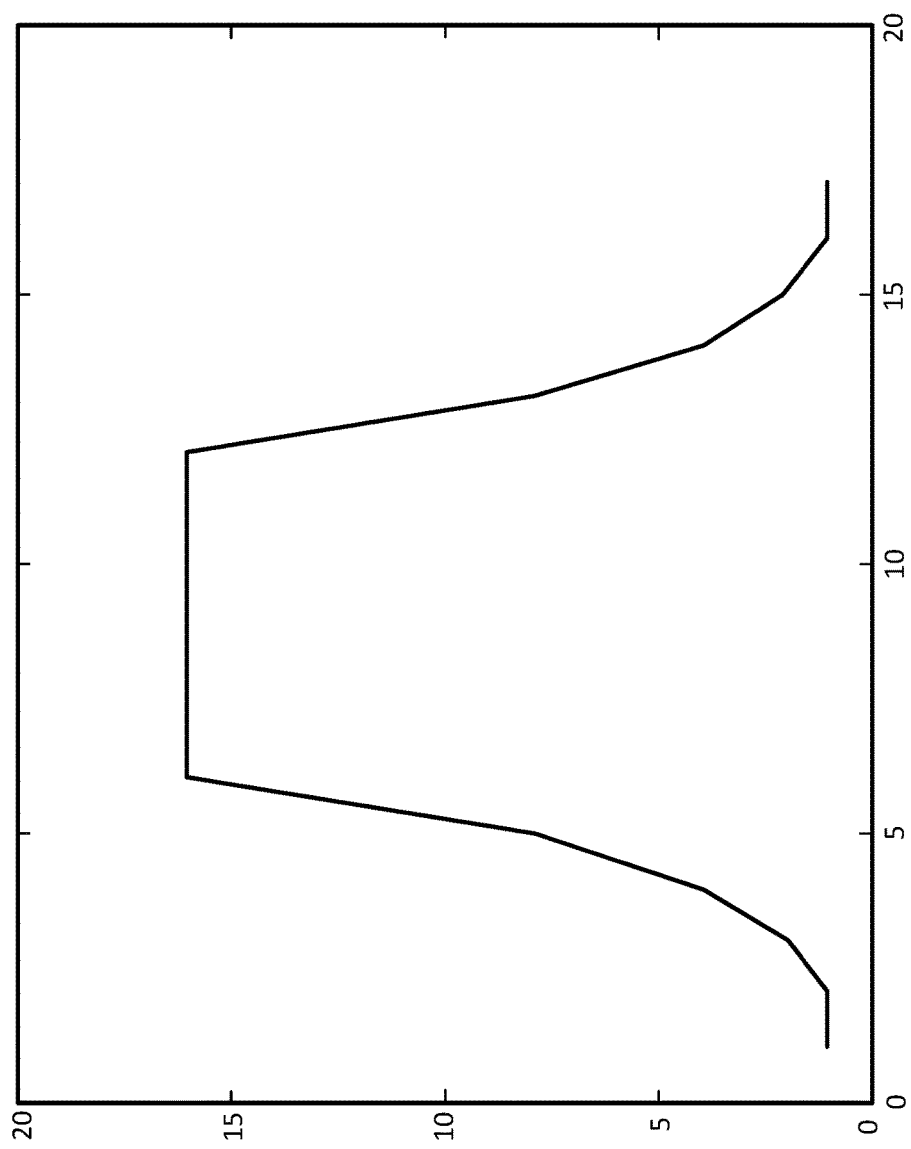
FIG. 8 shows an embodiment of a weighting blending function.

Finally, a phase blending function is used to blend those frame rate conversion results into the blurred output which looks like a 24 fps film. To simulate the true exposure time of 24 Hz film, an average function is used to blend these phases. The process can also use a weighted blending function to adjust the blurriness at the edge at the moving object like that shown in FIG. 8.

One may view this process as first upsampling the input frames to a higher frame rate, then applying a filter to combine multiple frames at a single pixel location together, and then downsampling the upsampled frames to the new frame rate. The upsampling may only include those frames that are used to create output frames. The process may create additional frames using frame interpolation such that the average frame rate of existing frames and newly interpolated frames combined are higher than the input or output frame rates.

Figure 9:
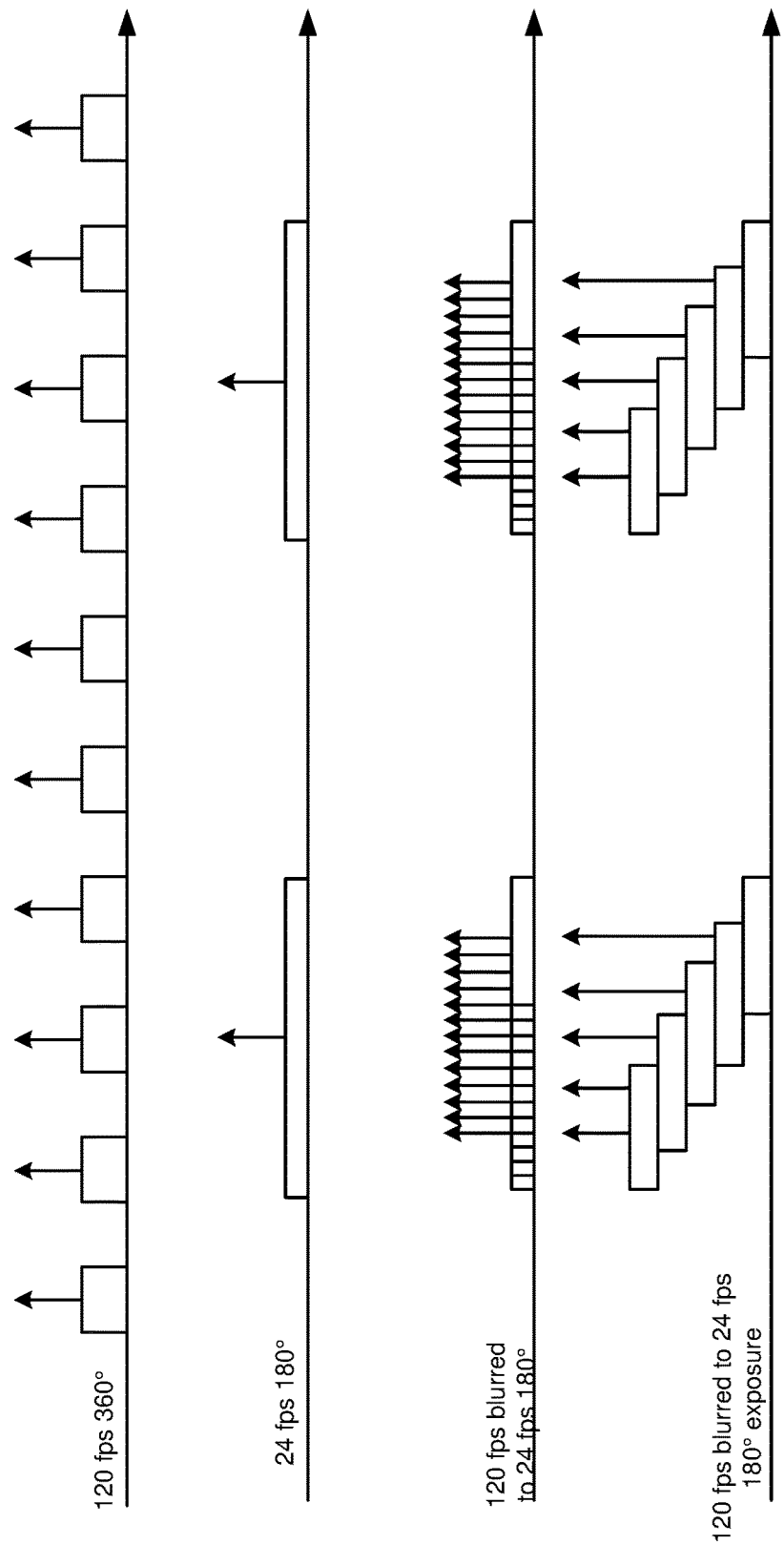
FIG. 9 shows an embodiment of generation of a 120 Hz blurred results from a 24 fps shutter angles and a blurred result.

To create 24 fps output, the blurred results can be the average of those frame rate conversion results using a phase LUT (look up table). If the process wants to produce a higher frame rate output, such as 120 Hz, 72 Hz, 48 Hz, which still looks like 24 fps film one can simply repeat the 24 fps frames to create the higher frame rate or blend between material designed for a higher frame rate with unequal sampling as described above and in FIG. 2, and the repeated frames. FIG. 9 shows how to generate the 120 Hz blurred results with 24 fps shutter angle (small rectangles) and the 24 fps blur result (large rectangles). It also shows the possible weighting and phases used to generate the 24 fps result as vertical arrows. 24 fps Shutter angle 180:

| 80 | 86 | 92 | 98 | 104 | 110 | 116 | 122 | 128 | 134 | 140 | 146 |
|----|----|----|----|-----|-----|-----|-----|-----|-----|-----|-----|
| 152 | 158 | 164 | 170 | 176 | | | | | | | |

120 fps output with shutter angle 180 like 24 fps:

| | 80 | | 104 | | 128 |
|---|----|---|-----|---|-----|
| | 152 | | 176 | | |

Figure 10:
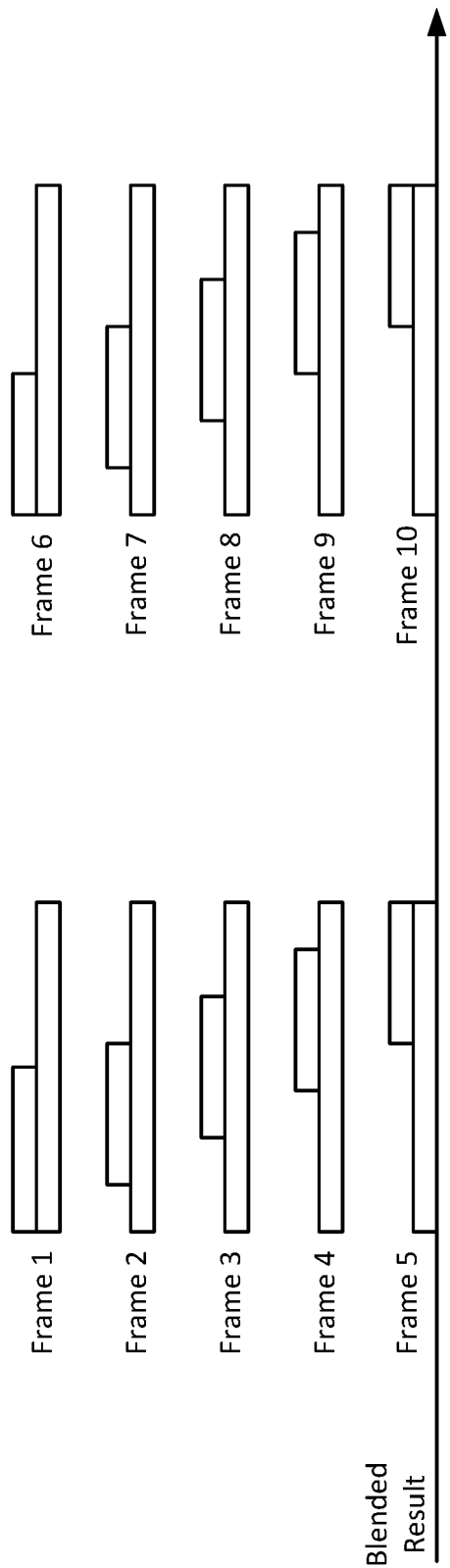
FIG. 10 shows an embodiment of an adjustment to the example of FIG. 9.

Because the high frame rate content is generated as a blend of the 120 fps with uneven sampling and the 24 fps that has been repeated it is possible to fine tune the amount of blurring that is visible without changing the shutter angle. It also simplifies the generation of 120 fps content by only requiring one out of 5 frames to be interpolated using 17 phases. To do this, the first step is to generate the 24 fps blurred results using the 17 phases from 80-176. This involves grouping the frames together, interpolating the frames within each group to create the desired shutter angle and then average the frames of the group together to create a lower frame rate video. Next the 5 frames are generated for the 120 fps higher frame rate video output with the phase equals to 80/104/128/152/176 that as previously described also results in a 180 degree shutter angle equivalent at 24 fps. Finally, a weighted blending between the 120 fps output and the 24 fps blurred results. The final 120 fps output can show the similar strobe level (due to the shutter angle) and allows the adjustment of the amount of blurring independent of the strobing artifacts. This is shown in FIG. 10.

In this manner one can convert high frame rate content to 24 fps cinema frame rates while maintaining the overall cinematic feel.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of converting an input frame rate of input video frames, comprising:
    upsampling at least some of the input video frames to create additional frames using frame interpolation such that an average frame rate of the incoming frames and newly interpolated frames combined are at a higher frame rate than either the input frame rate or the output frame;
    applying a filter to combine together multiple frames at a single pixel location; and
    downsampling the upsampled frames to the output frame rate.

2. The method of claim 1, wherein the upsampling only creates the upsampled frames of the higher frame rate that are used to create output frames.

3. The method of claim 1, further comprising blending interpolation phases between two video frames.

4. The method of claim 3, wherein blending phases comprises identifying a start position, an end position, and using the input frame rate to achieve a desired output shutter angle.

5. The method of claim 3, wherein the phases have even spacing.

6. The method of claim 3, wherein the phases have uneven spacing.

7. The method of claim 1, wherein applying a filter comprises applying a finite impulse response filter.

8. The method of claim 1, wherein a shutter angle of the input video frames is 270 degrees or less.

9. The method of claim 1, wherein the upsampling comprises performing motion compensated interpolation between input frames.

10. The method of claim 1 wherein the downsampling comprises grouping the frames together using a weighted average, where the number of groups per second equals a desired simulated frame rate.

11. The method of claim 1, further comprising converting the input frame rate simulating strobing at a low frame rate, wherein the low frame rate has a frame rate of less than 120 frames per second.

12. A method of converting an input frame rate of input video frames, comprising: grouping input video frames together, wherein a number of groups per second is less than a capture frame rate; and
    interpolating the frames within a group to obtain a desired shutter angle, wherein an average time between frames within a group is less than a time between groups.

13. The method of claim 12, further comprising combining frames in the groups to produce average frames.

14. The method of claim 13, further comprising using the average frames to create a lower frame rate video than the input frame rate.

15. The method of claim 14, further comprising upsampling the average frames to produce upsampled frames and create a higher frame rate video than the input frame rate.

16. The method of claim 15, further comprising performing a weighted average of the upsampled frames and the higher frame rate video to create an output video.

* * * * *